United States Patent
Gargaro et al.

(10) Patent No.: US 10,716,037 B2
(45) Date of Patent: Jul. 14, 2020

(54) ASSESSMENT OF MACHINE LEARNING PERFORMANCE WITH LIMITED TEST DATA

(71) Applicant: INTERNATIONAL BUSINESS MACHINES CORPORATION, Armonk, NY (US)

(72) Inventors: Gianluca Gargaro, Rome (IT); Davide Fazzone, Baiano (IT); Raffaele G Sperandeo, Marcianise (IT); Luigi Lombardi, Naples (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/157,202

(22) Filed: Oct. 11, 2018

(65) Prior Publication Data
US 2020/0120556 A1    Apr. 16, 2020

(51) Int. Cl.
*H04W 4/00* (2018.01)
*H04W 36/00* (2009.01)
(Continued)

(52) U.S. Cl.
CPC ..... *H04W 36/0055* (2013.01); *H04L 63/0807* (2013.01); *H04W 36/0009* (2018.08);
(Continued)

(58) Field of Classification Search
CPC ......... H04W 36/0009; H04W 36/0027; H04W 36/0038; H04W 36/0055; H04W 36/08;
(Continued)

(56) References Cited

U.S. PATENT DOCUMENTS

| | | | |
|---|---|---|---|
| 7,953,052 B2 * | 5/2011 | Park | H04W 36/26 370/338 |
| 8,060,093 B2 * | 11/2011 | Jang | H04W 36/0038 455/436 |

(Continued)

OTHER PUBLICATIONS

Ohba, et al., "Kerberized Handover Keying: A Media-Independent Handover Key Management Architecture", MobiArch'07, Aug. 27-31, pp. 1-7, Kyoto, JP, www.user.informatik.uni-goettingen.de/~mobiarch/2007/Ohba_MIHKey.pdf.

(Continued)

*Primary Examiner* — Alpus Hsu
(74) *Attorney, Agent, or Firm* — James W. Kappos

(57) ABSTRACT

Embodiments of the present invention disclose a method, computer program product, and system for accessing a network by one or more client devices via a plurality of access devices of wireless type. An access device receives a hand-over request for performing a hand-over from one of the client devices accessing the network via the access device, the hand-over request comprising an indication of one or more candidate access devices of the other access devices for performing the hand-over. The hand-over between the access device and a target access device of the candidate access devices is negotiate in response to the hand-over request. A further hand-over is negotiate of a further client device accessing the network via a source one of the other access devices between the access device and the source access device. The access device enables the further client device to access the network.

20 Claims, 10 Drawing Sheets

(51) Int. Cl.
*H04L 29/06* (2006.01)
*H04W 48/02* (2009.01)
*H04W 36/30* (2009.01)
*H04W 36/26* (2009.01)
*H04W 76/30* (2018.01)
*H04W 36/08* (2009.01)

(52) U.S. Cl.
CPC ... *H04W 36/0027* (2013.01); *H04W 36/0038* (2013.01); *H04W 36/26* (2013.01); *H04W 36/30* (2013.01); *H04W 48/02* (2013.01); *H04W 36/08* (2013.01); *H04W 76/30* (2018.02)

(58) Field of Classification Search
CPC ..... H04W 36/26; H04W 36/30; H04W 48/02; H04W 63/0807; H04W 76/30
See application file for complete search history.

(56) References Cited

U.S. PATENT DOCUMENTS

| | | | | |
|---|---|---|---|---|
| 8,228,861 | B1 * | 7/2012 | Nix | H04W 36/00 370/329 |
| 8,392,710 | B2 * | 3/2013 | Tie | H04L 9/0844 713/169 |
| 8,417,219 | B2 * | 4/2013 | Hahn | H04L 63/08 455/411 |
| 8,774,759 | B2 * | 7/2014 | He | H04W 36/14 455/410 |
| 8,942,207 | B2 * | 1/2015 | Son | H04W 36/0055 370/331 |
| 8,964,695 | B2 * | 2/2015 | Bachmann | H04L 63/164 370/331 |
| 9,014,137 | B2 * | 4/2015 | Appani | H04W 36/0033 370/310 |
| 9,699,702 | B2 * | 7/2017 | Fujishiro | H04W 16/32 |
| 9,713,040 | B2 * | 7/2017 | Cheng | H04W 36/0022 |
| 2008/0175393 | A1 | 7/2008 | Oba et al. | |
| 2011/0286437 | A1 | 11/2011 | Austin et al. | |
| 2012/0170471 | A1 | 7/2012 | Brown et al. | |
| 2015/0040195 | A1 | 2/2015 | Park et al. | |
| 2017/0086203 | A1 | 3/2017 | Chong et al. | |
| 2017/0208006 | A1 | 7/2017 | Patil et al. | |
| 2018/0352490 | A1 * | 12/2018 | Hu | H04W 12/04033 |

OTHER PUBLICATIONS

Callisch, et al., "Coping with Wi-Fi's biggest problem: interference", Network World, pp. 1-8, Aug. 2, 2010, IDG Communications, www.networkworld.com/article/2215287/tech-primers/coping-with-wi-fi-s-biggest-problem—interference.html.

Aboba, et al., "Extensible Authentication Protocol (EAP) Key Management Framework", Network Working Group, Aug. 2008, pp. 1-79, https://patents.google.com/scholar/3046634149068153041.

Cisco, "MAC Authentication Bypass", Americas Headquarters: Cisco Systems, Inc., 2007, 30 pages, San Jose, CA, USA, https://docstore.mik.ua/univercd/cc/td/doc/solution/macauthb.pdf.

Cisco, "Cisco Identity Services Engine with Identity and Access management and Single Sign-on Platforms", At-a-Glance, 2017, 2 pages, http://www.cisco.com/c/dam/en/us/products/collateral/security/identity-services-engine/at-a-glance-c45-732857.pdf.

* cited by examiner

ASSESSMENT OF MACHINE LEARNING PERFORMANCE WITH LIMITED TEST DATA

BACKGROUND

The present invention relates generally to the field of networking, and more particularly to mitigating wi-fi connection congestion using neighborhood trust handover.

Networks are commonly used to interconnect remote computing devices. A typical example is the Internet, which is formed by billions of computers connected one to another through a global communication network. Access to the Internet by client (computing) devices is often implemented with wireless techniques. This is mainly due to the widespread diffusion of mobile stations (MB), which are commonly used to access the Internet while moving around. Typical examples are Internet of Things (IoT) devices, which are substantially ubiquitous since they may appear almost everywhere. For this purpose, a commonplace technique is of connecting to Access Points (APs) of wireless type, for example, based on the Wi-Fi specification.

SUMMARY

Embodiments of the present invention disclose a method, computer program product, and system for accessing a network by one or more client devices via a plurality of access devices of wireless type. An access device receives a hand-over request for performing a hand-over from one of the client devices accessing the network via the access device, the hand-over request comprising an indication of one or more candidate access devices of the other access devices for performing the hand-over. The hand-over between the access device and a target access device of the candidate access devices is negotiate in response to the hand-over request. The access device receives a target hand-over token from the target access device via the client device and sends a source hand-over token to the target access device via the client device. The access device releases the client device from accessing the network via the access device in response to a positive result of said negotiating the hand-over. A further hand-over is negotiate of a further client device accessing the network via a source one of the other access devices between the access device and the source access device. The access device sends a further target hand-over token to the source access device via the further client device, the further target hand-over token being embedded in a management message for establishing access to the network. The access device receives a further source hand-over token from the source access device via the further client device, the further source hand-over token being embedded in a further management message for establishing access to the network. The access device enables the further client device to access the network via the access device in response to a positive result of said negotiating the further hand-over.

DETAILED DESCRIPTION

Figure 1A:
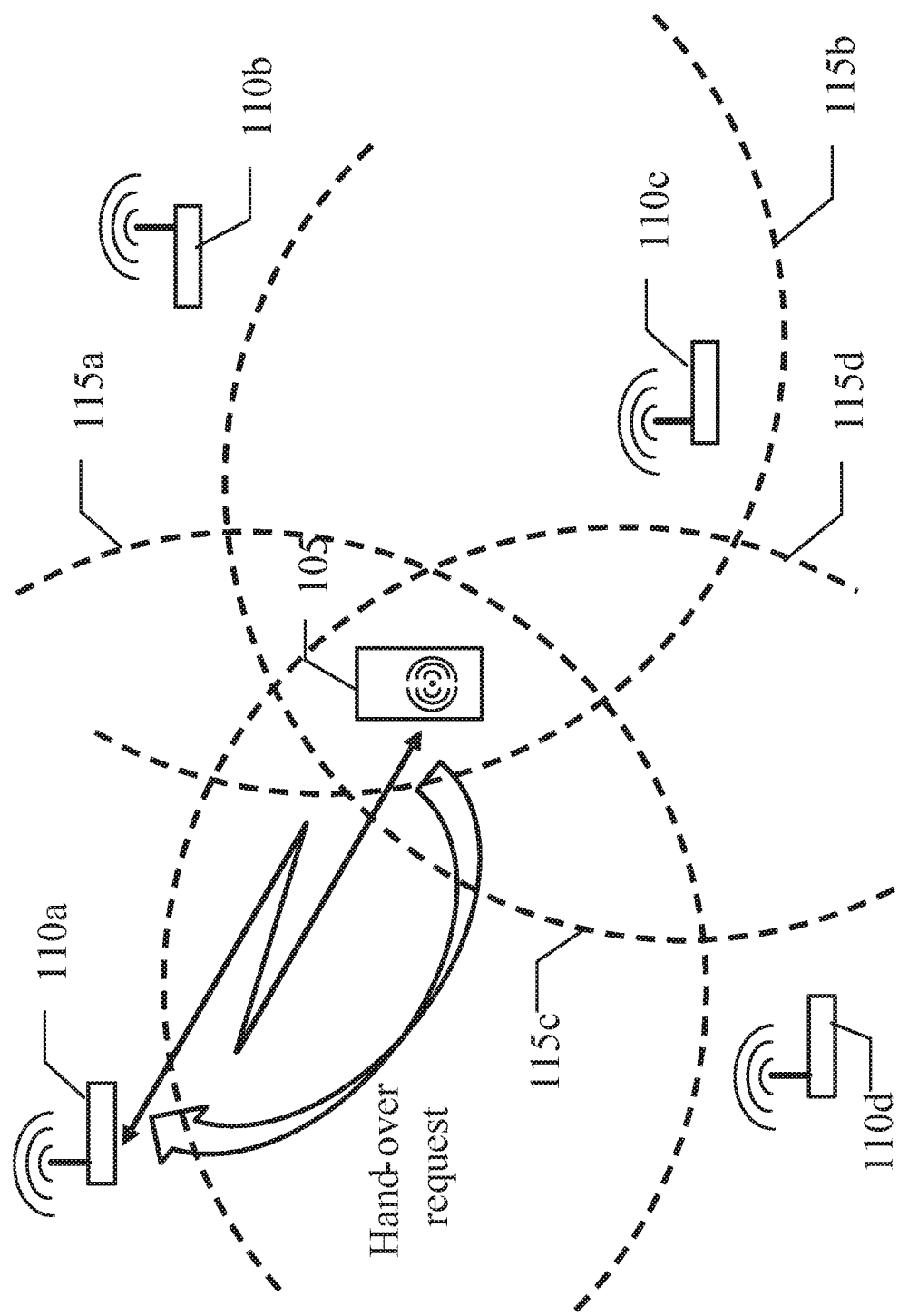
FIGS. 1A-1D are functional block diagram illustrating a distributed IoT environment, in accordance with an embodiment of the present invention.

Embodiments of the present invention relate to the field of computing, and more particularly to network bandwidth management. The following described exemplary embodiments provide a system, method, and program product to, among other things, negotiating a hand-over between a source device and a target device in order to generate and communicate a hand-over token from the source device to the target device. Therefore, the present embodiment has the capacity to improve the technical field of networking by mitigating wi-fi connection congestion using neighborhood trust handover.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

With the number of client devices that are connected to the access points increasing, there may be a reduction of their performance because of the intrinsic limitation of computational capability and available bandwidth of the access points. Moreover, when multiple access points cooperate by sharing a common communication channel, a co-channel interference may occur because of a crosstalk among the cooperating access points in a same area. When multiple non-cooperating access points use different channels in a same area, an overlapping interference may occur between adjacent channels spreading over common frequencies. In order to mitigate the above-mentioned co-channel and overlapping interferences, it is possible to lower a data rate or to reduce a signal power of the access points. Moreover, access points supporting adaptive beamforming may alter a pattern of a transmitted signal dynamically, by suitably controlling an array of antennas to generate a constructive or destructive interaction along different directions, so as to attenuate the transmitted signal in the direction of the interference.

As a result, a quality of the connection of a client device to a source access point may become too low; however, at the same time other candidate access points available in the same area may provide a better quality of the connection. In this situation, it is possible to perform a hand-over, or hand-off, wherein the access to the Internet is transferred from the source access point to a target access point, selected among the candidate access points. This is very common when the client device moves around, but it may also happen when the client device is stationary because of the above-mentioned adaptive beamforming, for example, when the transmitted signal of the source access point is attenuated, and/or the transmitted signal of other access points is intensified in the direction of the client device.

However, in most applications the hand-over should be performed only to other access points that are trusted, for example, supporting a suitable security mechanism ensuring that sensitive information is communicated in a protected way. Moreover, the access points should accept only client devices that are trusted; this may be challenging, especially in case of IoT devices that are growing in number and change dynamically, for example, in nature and location.

For this purpose, relatively quit complex security mechanisms may be implemented. However, these security mechanisms may not be supported by client devices with limited computational capabilities and/or requiring low power consumption. Therefore, a simpler authentication mechanism, for example, merely based on an identifier of the client devices, may be implemented. However, because of the intrinsic weaker security of the authentication mechanism, a limited access to the network is generally granted to the client devices with a default service level.

With reference in particular to FIGS. 1A-1D, an example is shown of application of the solution according to an embodiment of the present disclosure.

Starting from FIG. 1A, one or more client computing devices 105 access a network, for example, the Internet, to exploit resources and/or to exchange information. For example, the client devices 105 are IoT devices, i.e., objects different from computers (and traditionally non-Internet-enabled) that are provided with Internet connectivity. Generally, the IoT devices are everyday objects (such as appliances, vehicles, tools, etc.) with the addition of an electronic circuit implementing the required computational functionalities. The electronic circuit is typically implemented by a System on Chip (SOC) coupled with sensors/actuators that are supplied by batteries and capable of low power consumption.

The client device 105 may access the Internet via a plurality of access devices of wireless type (i.e., without any physical connection), for example, the access devices are access points based on the Wireless Fidelity (Wi-Fi) specification compliant with the IEEE 802.11 standard, four shown in the figure wherein they are denoted with the references 110a, 110b, 110c and 110d. Particularly, at the moment the client device 105 is within a transmission range 115a with the access point 110a; the client device 105 then accesses the Internet via the access point 110a (i.e., it is connected thereto for relaying information between the client device 105 and the Internet). However, at the same time the client device 105 is also within transmission ranges 115b, 115c and 115d with the available access points 110b, 110c and 110d, respectively, but without any connection thereto.

A hand-over of the client device 105 may be performed (to transfer its connection to another access point), for example, when a quality of the connection to the source access point 110a becomes too low. For this purpose, one or more candidate access points are selected among the available access points 110b, 110c and 110d that provide a better quality of the connection, for example, the access points 110b and 110c. In this situation, the client device 105 sends a hand-over request to the source access point 110a. The hand-over request comprises corresponding identifiers of the candidate access points 110b and 110c. In response, the source access point 110a selects a target access point among the candidate access points 110b and 110c for performing the hand-over, for example, the access point 110b, according to pre-arranged hand-over policies.

Figure 1B:
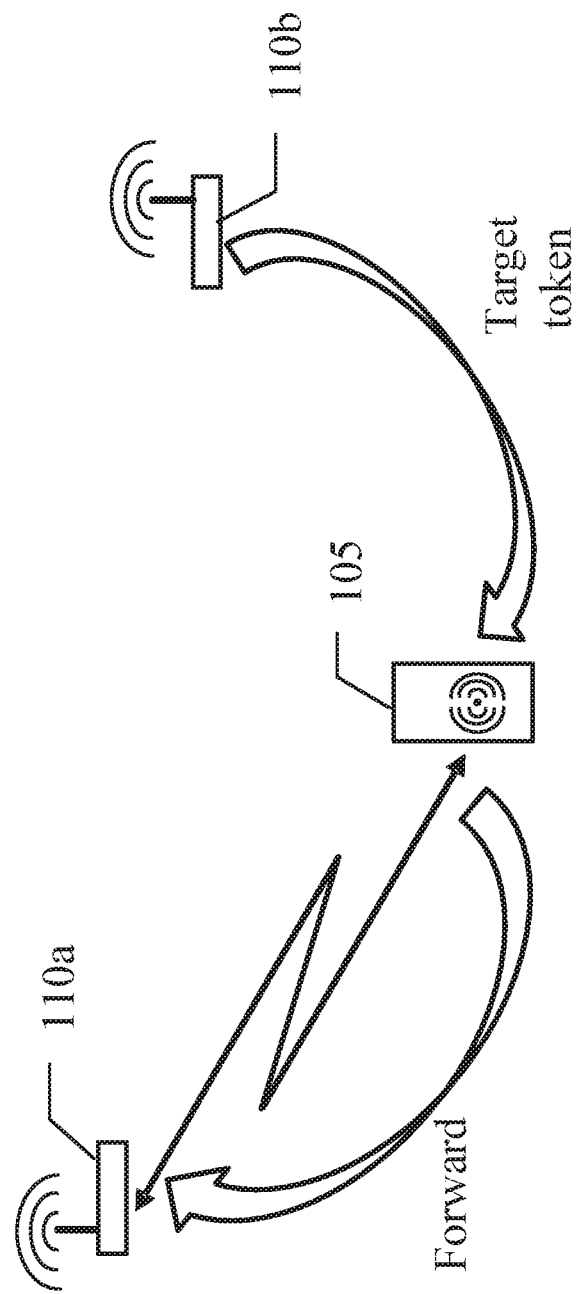

Moving to FIG. 1B, in the solution according to an embodiment of the present disclosure, the hand-over is then negotiated between the source access point 110a and the target access point 110b. For this purpose, corresponding hand-over tokens are exchanged between the source access point 110a and the target access point 110b via the client device 105. For example, after the source access point 110a has presented the client device 105 to the target access point 110b over a secure communication channel between them, the target access point 110b sends a target hand-over token, for example, encrypted with a public key of the source access point 110a, to the client device. The target token is embedded in a management message that is commonly used to establish access to the network. The client device 105 extracts the target token from the management message and forwards it to the source access point 110a over the corresponding connection.

Figure 1C:
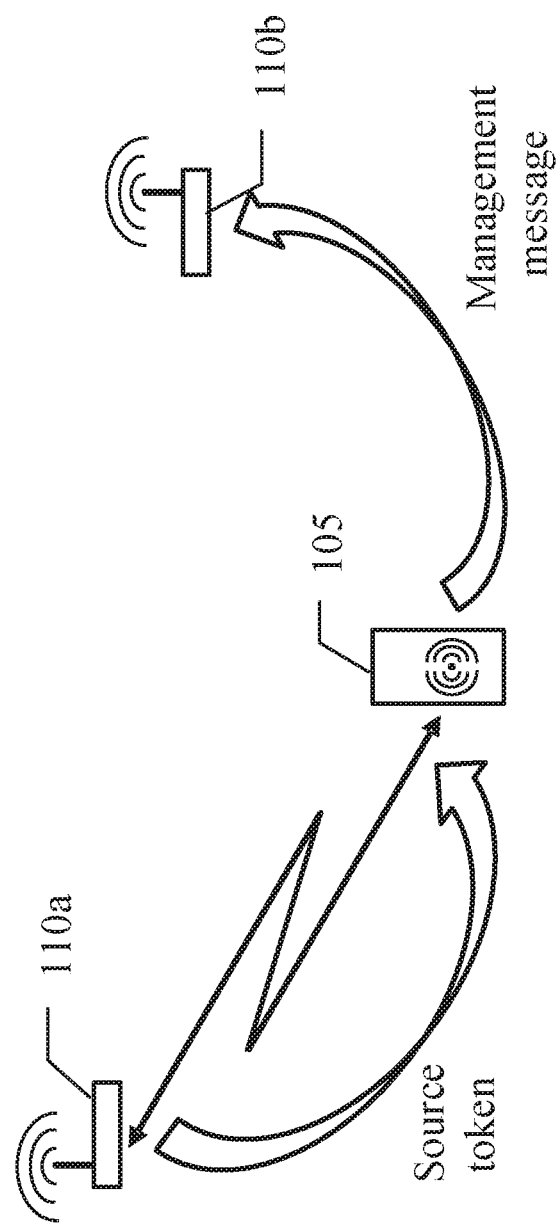

Moving to FIG. 1C, the source access point 110a receives the target token, for example, by decrypting it with its private key. Likewise, the source access point 110a sends a source hand-over token, for example, encrypted with a public key of the target access point 110b, to the client device over the corresponding connection. The client device 105 forwards the source token to the target access point 110b; the source token is embedded in a management message. The target access point 110b receives the source token, for example, by decrypting it with its private key.

Figure 1D:
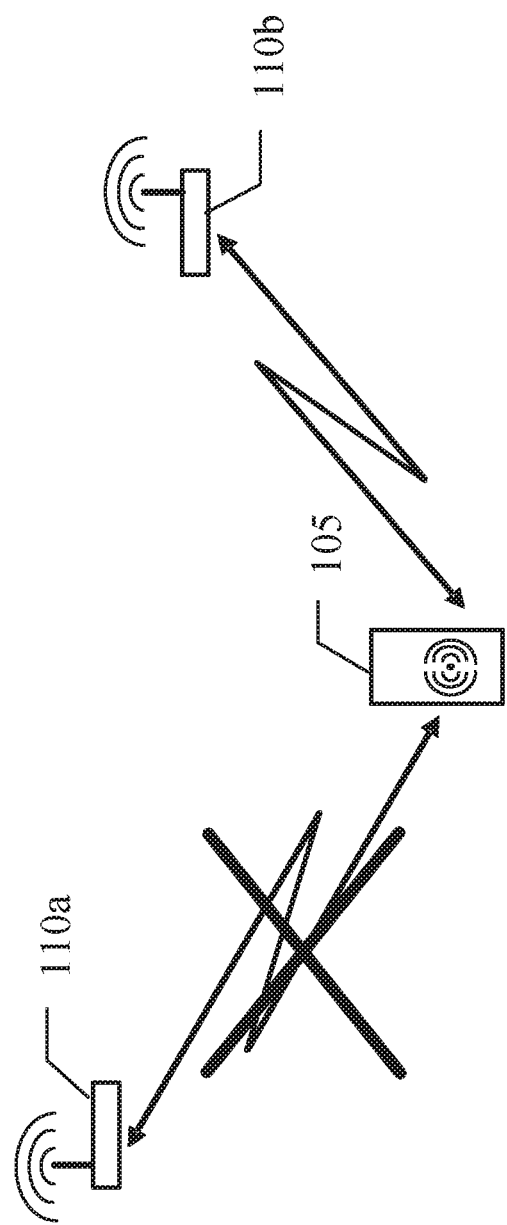

Moving to FIG. 1D, in response to a successful result of the negotiation of the hand-over the access to the network of the client device 105 is transferred from the source access point 110a to the target access point 110b. For example, the source access point 110b releases the connection with the client device 105 and the target access device 110b enables the client device 105 to connect thereto.

In this way, the client device connects to a target access point that is trusted and, at the same time, the target access point allows the connection to a client device that is trusted.

The above-mentioned result is achieved by negotiating the hand-over directly by the source access point and the target access point, with the client device that simply acts as a relay of the source/target tokens.

Therefore, the proposed solution is independent of the client device. This makes the solution particularly advantageous when the client device has limited computational capabilities and/or requires low power consumption, as typical of IoT devices.

Nevertheless, the negotiation of the hand-over passes through the client device; this makes the solution very scalable, especially when the client devices are growing in number and change dynamically in nature and location, again as typical of the IoT devices.

For this purpose, the target/source tokens that are transmitted between the client device and the target access point are embedded in corresponding management messages, without any connection of the client device to the target access point. This result is achieved by leveraging a functionality that is already available to establish access to the network, so that it only requires minor changes to the client devices and the access points.

Figure 2:
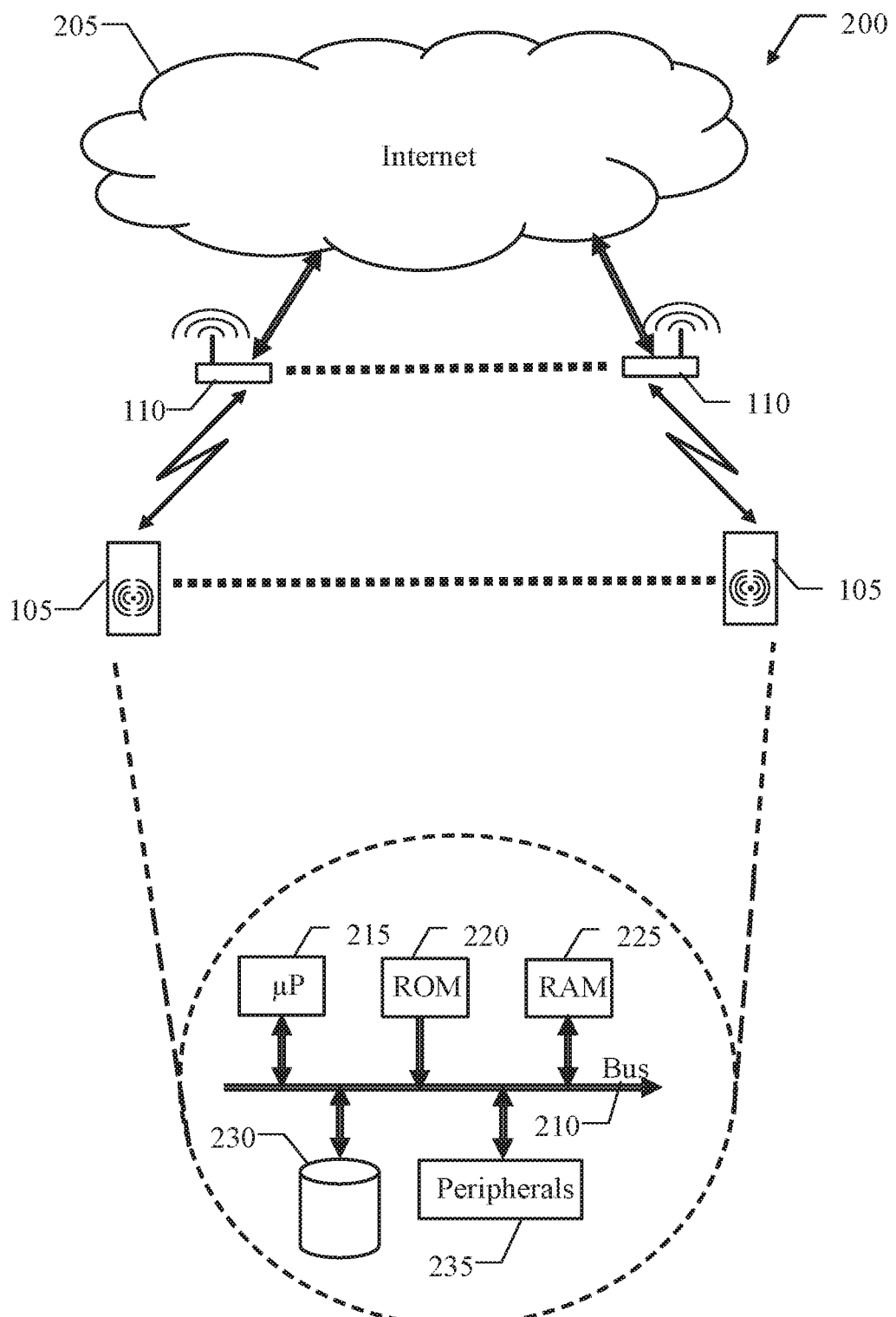
FIG. 2 is a schematic block diagram of a computing system, in accordance with an embodiment of the present invention.

With reference now to FIG. 2, a schematic block diagram is shown of a computing system 200 wherein the solution according to an embodiment of the present disclosure may be practiced.

The computing system 200 comprises the above-mentioned client devices 105 and access points, generically denoted with the reference 110. The access points 110 are connected to the Internet, denoted with the reference 205, via Internet Service Providers (ISPs), not shown in the figure, for example, in a wired way through a fixed-line telephone network.

Each device formed by one of the client devices 105 or one of the access points 110 comprises several units that interface through a bus architecture 210 with one or more levels. Particularly, one or more microprocessors (µP) 215 control operation of the client device 105, or access points 110. A non-volatile memory (ROM) 220 stores basic code for a bootstrap of the client device 105, or access points 110 and a volatile memory (RAM) 225 is used as a working memory by the microprocessors 215. The client device 105, or access points 110 is provided with a mass-memory 230 for storing programs and data, for example, an E2PROM. Moreover, the client device 105, or access points 110 comprises a number of controllers for peripherals, or Input/Output (I/O) units, 235; for example, the peripherals 235 of each client device 105 comprise a Wireless Network Interface Card (WNIC) of the Wi-Fi type for communicating with the access points 110 and possibly one or more sensors, for example, of temperature, sound, acceleration type and so on, and/or actuators, for example, of electric, hydraulic, pneumatic type and so on type, whereas the peripherals of each access point 100 comprise a WNIC of the Wi-Fi type for communicating with the client devices 105, a switch for communicating in a corresponding Wireless Local Area Network (WLAN) by stations thereof consisting of the access point 110 and the client devices 105 connected to the access point 110, and a router for communicating with the fixed-line telephone network.

Figure 3:
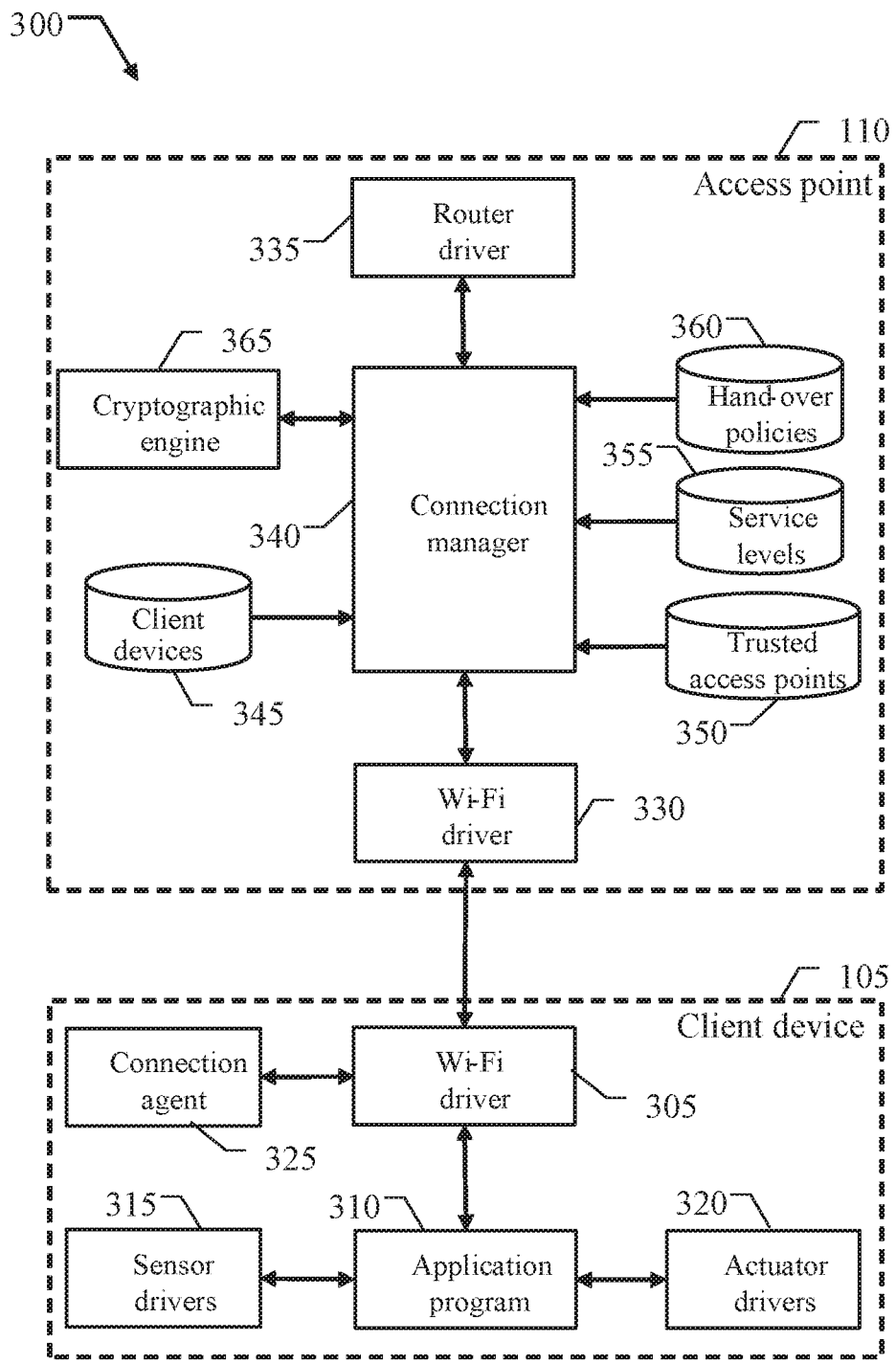
FIG. 3 is a functional block diagram depicting software components of an application, in accordance with an embodiment of the present invention.

With reference now to FIG. 3, the main software components are shown that may be used to implement the solution according to an embodiment of the present disclosure.

Particularly, all the software components are denoted as a whole with the reference 300. The software components are typically stored in the mass memory and loaded, at least in part, into the working memory of each client device 105, or access points 110 when the programs are running. The programs are pre-installed into the mass memory and maintained up-to-date from the Internet. In this respect, each program may be a module, segment or portion of code, which comprises one or more executable instructions for implementing the specified logical function.

Each client device 105 comprises the following software components. A Wi-Fi driver 305 drives the WNIC for implementing communications of the client device 105 with any available access points 110 within the corresponding transmission ranges; the Wi-Fi driver 305 stores a shared password that is used to encrypt the communications with the access point 110, if any, to which the client device 105 is currently connected. An application program 310 implements the functionalities of the access device, for example, environment monitoring, manufacturing control, home automation, health monitoring, traffic control, energy saving and so on. The application program 310 interfaces with the Wi-Fi driver 305. Moreover, the application program 310 exploits one or more sensor drives 315 driving corresponding sensors, if any, and/or it controls one or more actuator drivers 320 driving corresponding actuators. In the solution according to an embodiment of the present disclosure, a connection agent 325 interfaces with the Wi-Fi driver 305 for performing the hand-overs.

Each access point 110 comprises the following software components. A Wi-Fi driver 330 drives the WNIC for implementing communications with any client devices 105 within the corresponding transmission ranges. A router driver 335 drives the router for implementing communications, for example, with the fixed-line telephone network. A connection manager 340 manages the connections of the client devices 105 to the access point 110. The connection manager 340 interfaces with the Wi-Fi driver 330 and with the router driver 335. The connection manager 340 accesses, in read/write mode, a client device repository 345. The client device repository 345 has an entry for each client device 105 that is currently connected to the access point 110. The entry comprises a unique identifier of the client device 105, for example, its MAC address, and the password that is used to encrypt the communications with it.

In the solution according to an embodiment of the present disclosure, the connection manager 340 accesses, in read mode, a trusted access point repository 350. The trusted access point repository 350 has an entry for each other trusted access point with which an agreement has been established for performing the hand-overs, for example, to or from it. The entry comprises a public key of the trusted access point, used to establish a secure communication channel with it. The connection manager 340 accesses, in read mode, a service level repository 355. The service level repository 355 stores information relating to corresponding service levels, defined globally by corresponding unique identifiers, further indicating an order of the server levels, such as decreasing from 1 to 100, and by their Service Level Agreements (SLAs), for example, in terms of one or more parameters that should be guaranteed for the connections, such as their bandwidth, Signal to Noise Ratio (SNR), etc. Particularly, the service level repository 355 has an entry for each service level that the access point may provide for the hand-overs; the entry comprises the identifier of the service level and a demanded range of a demanded cost for providing a connection at the service level, when the access point operates as target of a hand-over. Moreover, the service level repository 355 has an entry for each service level that the access point may accept for the hand-overs; the entry comprises the identifier of the service level and an offered range of an offered cost for transferring a connection at the service level, when the access point operates as source of a hand-over. The connection manager 340 accesses, in read mode, a policy repository 360. The policy repository 360 has an entry for each hand-over policy that has been pre-arranged between a pair formed by the access point and a trusted access point for performing a type of hand-over, for example, to or from it. The entry comprises a unique identifier of the hard-over policy, the identifier of the source access point and the identifier of the target access point. The entry comprises a priority index for the hand-over to the target access point, for example, from 1 to 100 in decreasing order of preference. The entry comprises one or more negotiation rules for negotiating the hand-over, for example, indicating one or more minimum values of the service level to be provided by the access point operating as target, for example, when a workload of the access point reaches a threshold such as 90%, when no hand-over has been required in a last period such as 20-40 minutes and so on, a penalty for not providing the hand-over, one or more minimum values of the service level to be accepted by the access point operating as source, a penalty for not accepting the hand-over, one or more obligations, for example, a maximum number of hand-overs that may be refused. The connection manager 340 exploits a cryptographic engine 365, which performs cryptographic operations; the cryptographic engine 365 has, hard encoded, a pair of public key and private key of the access point 110.

Figure 4A:
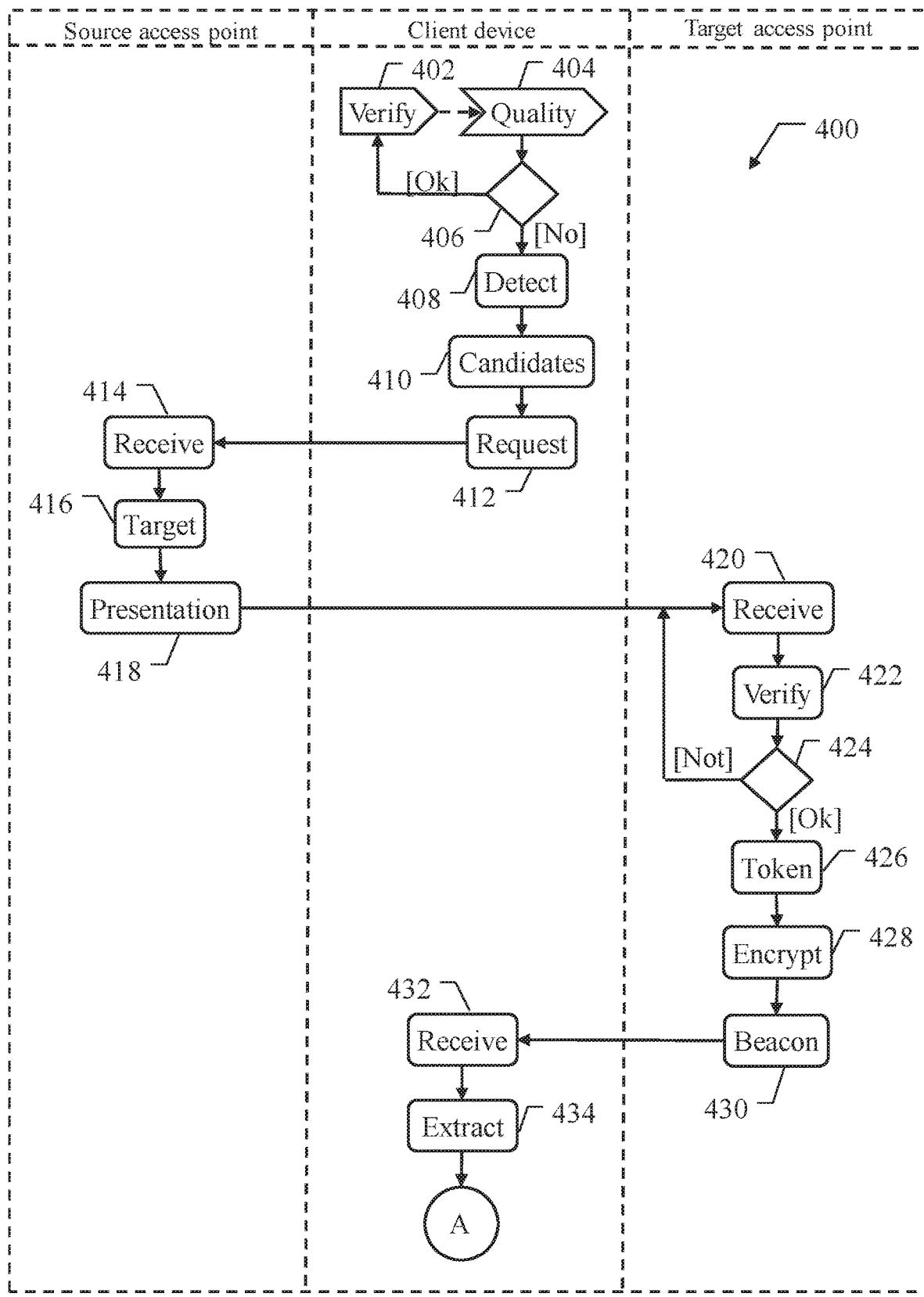
FIGS. 4A-4C are lane diagrams depicting the flow of activities relating to an exemplary embodiment of the present invention.
Figure 4B:
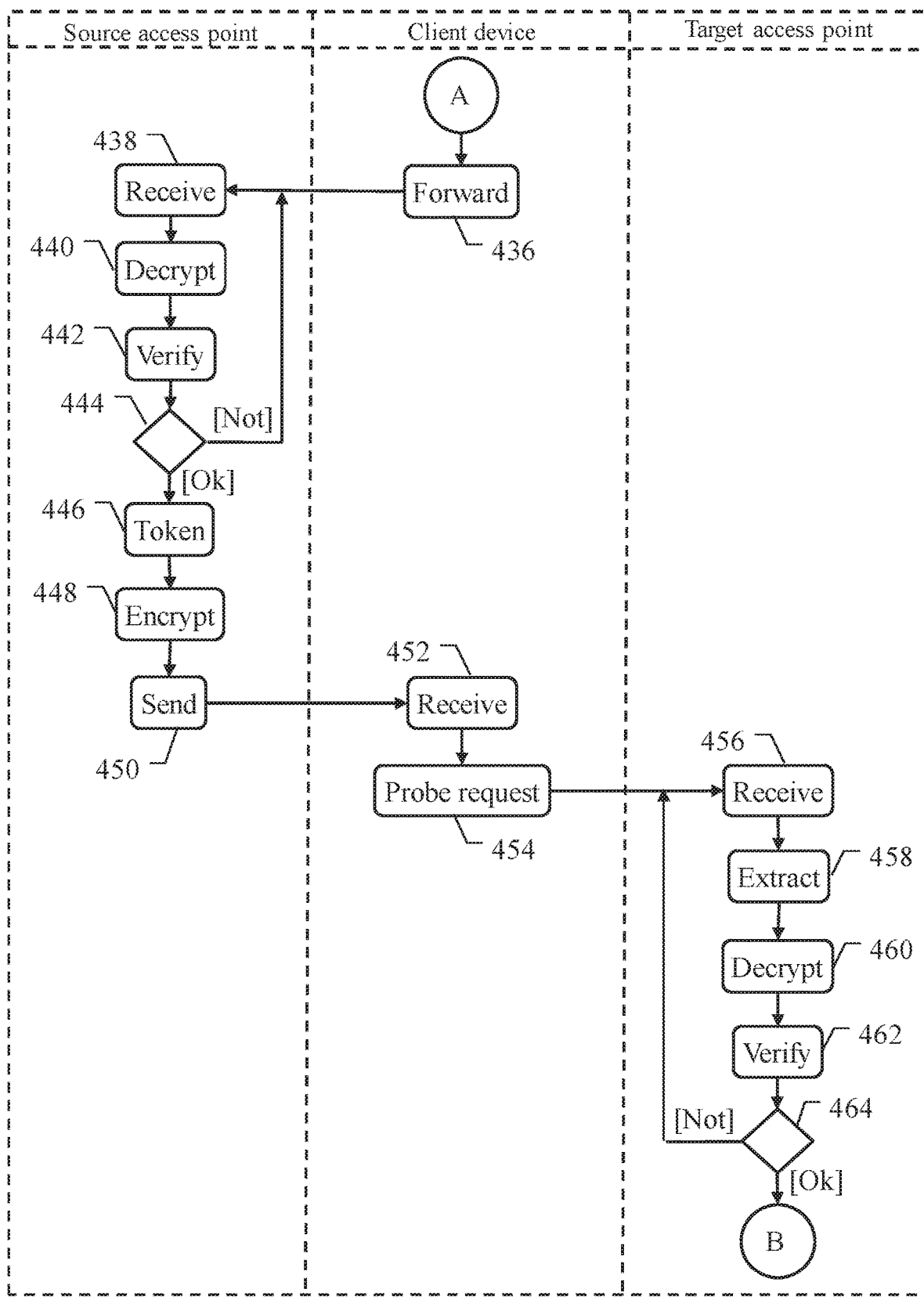
Figure 4C:
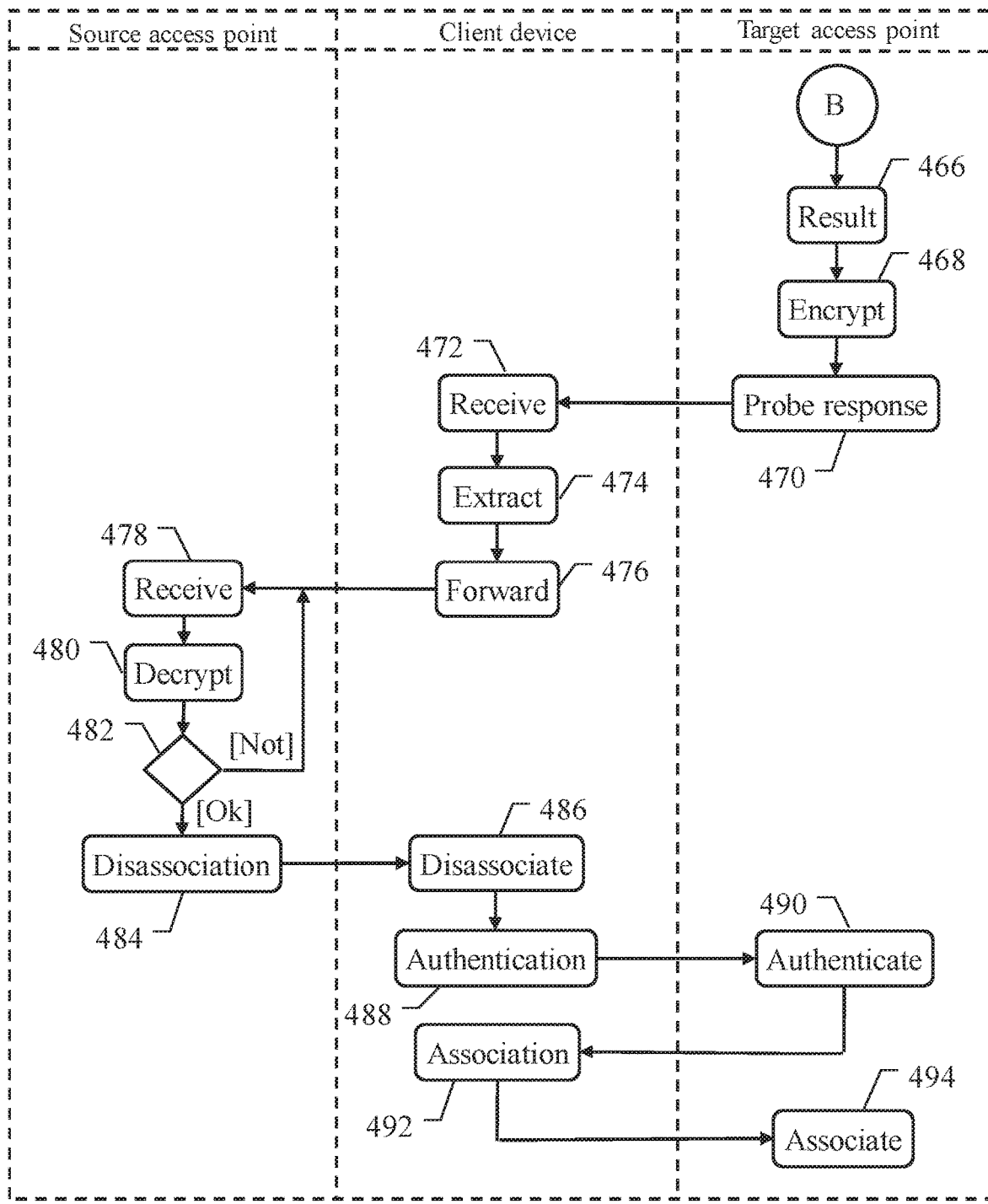

With reference now to FIG. 4A-FIG. 4C, an activity diagram is shown describing the flow of activities relating to an implementation of the solution according to an embodiment of the present disclosure.

Particularly, the activity diagram represents an exemplary process that may be used to perform a hand-over by a generic client device with a method 400. In this respect, each block may correspond to one or more executable instructions for implementing the specified logical function on the corresponding computing device.

For this purpose, reference is made in the following to the 802.11 specification. In this case, the stations, for example, client devices and access points, communicate by means of frames. Each frame comprises a header, an optional body and a check. The header comprises fixed-length fields providing control information of the frame, such as a type and sub-type of the frame, whether the content of the frame is fragmented in next frames, for example, up to a maximum of 128, an identifier (BSSID) of a transmitter of the frame, for example, 4 octets, and an optional identifier (BSSID) of a receiver of the frame, for example, 4 octets, generally defined by MAC addresses of the corresponding WNICs. The body, for example, from 0 to 2312 octets, provides a payload of the frame depending on its type, comprising fixed-length non-information elements and/or variable-length information elements, whose lengths, up to 253 octets, have to be specified in their first octet. The check comprises a fixed-length field providing redundant information for error detection and possible correction. The types of the frames may be management, data and control; the management frames are used to establish and to maintain connections, the data frames are used to transmit data and the control frames are used to assist the delivery of the data frames.

Particularly, the sub-types of the management frames comprise beacon frames, probe request frames and probe response frames. The beacon frames are used by each access point to announce its presence continually in the corresponding transmission range. Each beacon frame comprises the identifier of the transmitter (i.e., the access point), a first (0) information element (at most of 32 octets) with a name of the corresponding WLAN (SSID) and several information elements indicating characteristics of the access point, for example, data rate. The probe request frames are used by the stations to request information to other stations; each probe request frame comprises the identifier of the transmitter, the identifier of the receiver and one or more information elements indicating the requested information, for example, capability, data rate and so on. The probe response frames are used by the stations to return the information requested by the probe request frames; each probe response frame comprises the identifier of the transmitter, the identifier of the receiver and one or more information elements providing the requested information.

The management frames may also be used to transmit non-standard ad-hoc information, with a technique known as management frame overloading. For example, the ad-hoc information may be written in an unused part of the information element containing the identifier of the WLAN, for example, its last 29 octets, and then up to a maximum of 29 multiplied by 128, or 3.712 octets, when fragmented in several frames, without any increase of the size of the management frames and without requiring any change to the Wi-Fi driver. For example, the addition of the ad-hoc information that generally does not cause conflict in most of the IoT devices that do not display the identifier of the WLAN. As a further example, the ad-hoc information may be written in an unused part of the field containing the identifier of the transmitter, for example, its last 2 octets, and then up to a maximum of 2 multiplied by 128, or 512 octets, when fragmented in several frames, again without any increase of the size of the management frames and without requiring any change to the Wi-Fi driver. As a further example, the ad-hoc information may be written in an optional last information element 221 that is available for vendor-specific information, with the possibility of transmitting a large amount of ad-hoc information (i.e., up to a maximum of 253*128=32.384 octets when fragmented in several frames).

With reference now to the method 400, in the swim-lane of the client device the process passes from block 402 to block 404 as soon an event occurs triggering a verification of a quality of the connection with the source access point to which the client device is currently connected, for example, periodically such as every 1-10 ms. In response, the Wi-Fi driver collects one or more quality metrics of the connection with the source access point, for example, by calculating its SNR, by measuring the signal power, by sending a probe request frame for the bandwidth and receiving it with a corresponding probe response frame, by measuring a transmission round trip time between the transmission of the probe request frame and the receipt of the corresponding probe response frame, and so on. The flow of activity branches at block 406 according to the quality metrics. If the quality metrics indicate that the quality of the connection is acceptable, for example, when a quality indicator equal to a weighted sum thereof is above a threshold, the process returns to the block 402 without performing any action. Conversely, the process continues to block 408 wherein the Wi-Fi driver determines a list of available access points. For this purpose, the Wi-Fi driver listens for every beacon frames that are broadcast periodically by all the access points. For each received beacon frame, the Wi-Fi driver determines whether the corresponding access point is compatible with the client device according to its characteristics extracted from the beacon frame and if so adds its identifier, extracted from the beacon frame, to the list of available access points. If at least one available access point has been found (otherwise, not shown in the figure, the process returns to the block 402 without performing any action), the Wi-Fi driver at block 410 determines a list of candidate access points, for performing the hand-hover, among the available access points. Particularly, for each available access point the Wi-Fi driver collects the same quality metrics of a possible connection and then calculates the same quality indicator as above; if the quality indicator of the available access point is significantly higher than the quality indicator of the source access point, for example, exceeding it by a threshold, such as 0-20% thereof, the Wi-Fi driver adds the identifier of the available access point and its quality indicator to the list of candidate access points. If at least one candidate access point has been found (otherwise, not shown in the figure, the process again returns to the block 402 without performing any action) the connection agent at block 412 builds a corresponding hand-over request comprising the list of candidate access points. The connection agent sends the hand-over request, for example, via the Wi-Fi driver to the source access point over the corresponding connection.

Moving to the swim-lane of the source access point, the connection manager at block 414 receives the hand-over request, for example, via the Wi-Fi driver, from the client device. The connection manager at block 416 selects the target access point, for performing the hand-over, among the candidate access points. Particularly, for each candidate access point the connection manager verifies whether a hand-over policy, with the identifier of the candidate access point as target of the corresponding pair, exists in the corresponding repository. If the candidate access point is trusted by the source access point, the connection manager calculates a preference indicator of the candidate access point, for example, equal to a weighted sum of its priority index retrieved from the hand-over policy and its quality indicator. The connection manager sets the target access point to the candidate access point having the higher preference indicator. If the target access point has been found (otherwise, not shown in the figure, the process returns to the block 414 without performing any action), the connection manager at block 418 builds a corresponding presentation message. The presentation message comprises the identifier of the client device and the identifier of the hand-over policy corresponding to the target access point. The connection manager sends the presentation message to the target access point over the corresponding secure communication channel defined by the cryptographic engine via the public key of the target access point, for example, retrieved from the trusted access point repository. The use of the presentation message, and particularly its transmission over the secure communication channel, further improves the security of the process.

Moving to the swim-lane of the target access point, its connection manager at block 420 receives the presentation message and decrypts it with its private key. The connection manager at block 422 verifies whether the hand-over policy indicated in the presentation message exists in the corresponding repository and, if so, whether the source access point is indicated as such in it. The flow of activity branches at block 424 according to a result of this verification. If the result is negative such that the source access point is not trusted by the target access point, the process returns to the block 420 without performing any action. Conversely, the process continues to block 426 wherein the connection manager builds the target token for negotiating the hand-over. The target token comprises the identifier of the target access point, the identifier of the hand-over policy and a list of hand-over demands, each one comprising the identifier of a service level and the corresponding demanded cost. The hand-over demands are determined according to the service levels that the target access point may provide and that meet the negotiation rules of the hand-over policy, as indicated in the corresponding repositories. For example, if the target access point may provide the service levels from 1 to 7 and the negotiation rules constraint the target access point to provide at least the service level 3, the list of hand-over demands will comprise the service levels from 1 to 3; the demanded cost of each service level is set to the upper limit of its demanded range, for example, 10 for a demanded range 5-10 of the service level 1, 7 for a demanded range 3-7 of the service level 2 and 5 for a demanded range 2-5 of the service level 3. The encryption engine at block 428 encrypts the target token with the public key of the source access point, retrieved from the trusted access point repository. The connection manager at block 430 adds the encrypted target token and the identifier of the client device, as indicated in the presentation message, as had-hoc information into one or more beacon frames and then broadcasts them, for example, via the Wi-Fi driver.

Returning to the swim-lane of the client device, its Wi-Fi driver at block 432 receives any beacon frames, for example, being listening for them. The connection agent at block 434 recognizes the beacon frames sent by the target access point thanks to the presence of the identifier of the client device in its ad-hoc information; in this case, the connection agent extracts the encrypted target token from the ad-hoc information of the beacon frames, for example, concatenating their fragments. The connection agent at block 436 forwards the encrypted target token, for example, via the Wi-Fi driver, to the source access point over the corresponding connection.

Moving to the swim-lane of the source access point, its Wi-Fi driver at block 438 receives the encrypted target token from the client device. The encryption engine at block 440 decrypts the encrypted target token, thereby restoring its original form, with the private key of the source access point; this ensures that the target token is addressed to the source access point. The connection manager at block 442 verifies whether the identifiers of the hand-over policy and of the target access point indicated in the target token are correct. The flow of activity branches at block 444 according to a result of this verification. If the result is negative, such that the target token is not correct, the process returns to the block 438 without performing any action. Conversely, the process continues to block 446 wherein the connection manager builds the source token, for negotiating the hand-over. The source token comprises the identifier of the source access point, the identifier of the hand-over policy and a list of hand-over offers, each one comprising the identifier of a service level and the corresponding offered cost. The hand-over offers are determined according to the hand-over demands, indicated in the target token, and according to the service levels that the source access point may provide and that meet the negotiation rules of the hand-over policy, as indicated in the corresponding repositories. For example, in the scenario at issue, wherein the hand-over demands are for the service level 1 with demanded cost 10, the service level 2 with demanded cost 7 and the service level 3 with demanded cost 5, if the negotiation rules constraint the source access point to accept at least the service level 2, the list of hand-over offers will comprise the service levels from 1 to 2. The offered cost of each service level is set to the demanded cost if it is lower than the upper limit of the offered range plus a possible penalty, for example, 10 for the service level 1 having the demanded cost 10 with an offered range 4-9 and a penalty 3 since 10<9+3=12, or to the upper limit of the offered range otherwise, for example, 9 in the same case but now with a penalty 0 since 9<10+0=10 and 7 for the service level 2 having the demanded cost 7 with an offered range 3-8 for any penalty since 7<8. The encryption engine at block 448 encrypts the source target token with the public key of the target access point, retrieved from the trusted access point repository. The connection manager at block 450 sends the encrypted source token, for example, via the Wi-Fi driver, to the client device over the corresponding connection.

Returning to the swim-lane of the client device, the connection agent at block 452 receives the encrypted source token, for example, via the Wi-Fi driver, from the source access point. The connection agent at block 454 adds the encrypted source token as had-hoc information into one or more probe request frames and then sends them, for example, via the Wi-Fi driver, to the target access point from which it has previously received the encrypted token.

Moving to the swim-lane of the target access point, its Wi-Fi driver at block 456 receives any probe request frames, being listening for them. The connection manager agent at block 458 extracts the encrypted source token from the ad-hoc information of the probe request frames received from the client device, for example, concatenating their fragments. The encryption engine at block 460 decrypts the encrypted source token, thereby restoring its original form, with the private key of the target access point, ensuring that the source token is addressed to the target access point. The connection manager at block 462 verifies whether the identifiers of the hand-over policy and of the source access point indicated in the source token are correct. The flow of activity branches at block 464 according to a result of this verification. If the result is negative, such that the source token is not correct, the process returns to the block 456 without performing any action. Conversely, the process continues to block 466 wherein the connection manager determines a negotiation result of the negotiation of the hand-over. The negotiation result is determined according to the hand-over offers, indicated in the source token, and according to the negotiation rules of the hand-over policy, as indicated in the corresponding repository. For example, the connection manager verifies whether any acceptable offered costs exist, which fall within the corresponding demanded ranges. If so, the negotiation result is positive, and the hand-over request is accepted for the most convenient offered cost, such as the one having the highest difference with respect to a central value of the corresponding demanded range. Therefore, in the last scenario at issue wherein both the offered cost 9 of the service level 1, for example, within the demanded range 5-10 with a difference of 9−(10+5)/2=2.5) and the offered cost 7 of the service level 2 (falling within the demanded range 3-7 with a difference of 7−(7+3)/2=2) are acceptable, the hand-over request is accepted for the first one (2.5>2). Conversely, the negotiation result is still positive, for example, when accepting one offered cost has an extra-cost, given by a difference between the lower limit of the demanded range and the offered cost, lower than a possible penalty for not providing the required service level, or it is negative otherwise.

For example, in a different scenario with a single offered cost 2 that is not acceptable because falling outside a corresponding demanded range 4-8, the hand-over request is still acceptable if the corresponding extra-cost (4−2=2) is lower than the penalty, for example 3, or the negotiation result is negative otherwise, for example, when the penalty is 1. The encryption engine at block 468 encrypts a result token corresponding to the negotiation result, i.e., positive, comprising the accepted service level and cost, or negative, with the public key of the source access point, retrieved from the trusted access point repository. The connection manager at block 470 adds the encrypted result token as had-hoc information into one or more probe response frames, for the received probe request frames, then sends them, for example, via the Wi-Fi driver, to the client device.

Returning to the swim-lane of the client device, its Wi-Fi driver at block 472 receives the probe response frames addressed to the Wi-Fi driver. The connection agent at block 474 extracts the encrypted result token from the ad-hoc information of the probe response frames and may concatenating their fragments. The connection agent at block 476 forwards the encrypted result token, for example, via the Wi-Fi driver, to the source access point over the corresponding connection.

Moving to the swim-lane of the source access point, its Wi-Fi driver at block 478 receives the encrypted result token from the client device. The encryption engine at block 480 decrypts the encrypted result token, thereby restoring its original form, with the private key of the source access point. The flow of activity branches at block 482 according to the negotiation result. If the negotiation result is negative, the process returns to the block 478 without performing any action. Conversely, the process continues to block 484 wherein the connection of the client device is transferred from the source access point to the target access point, at the corresponding cost.

For this purpose, the Wi-Fi driver at block 484 sends a disassociation frame to the client device and then releases the corresponding connection. In response, in the swim-lane of the client device its Wi-Fi driver at block 486 disassociates from the source access point. The Wi-Fi driver at block 488 sends an authentication frame, for example, via the Wi-Fi driver, to the target access point. In the swim-lane of the target access point, its Wi-Fi driver at block 490 receives the authentication frame. In response, the connection manager authenticates the client device and returns a further authentication frame with its result, for example, via the Wi-Fi driver, to the client device. If the result of the authentication is positive, in the swim-lane of the client device its Wi-Fi driver at block 492 sends an association request frame to the target access point. In response, in the swim-lane of the target access point its Wi-Fi driver at block 494 establishes a connection with the client device, by allocating the required resources, and then returns a corresponding association response frame to the client device.

Figure 5:
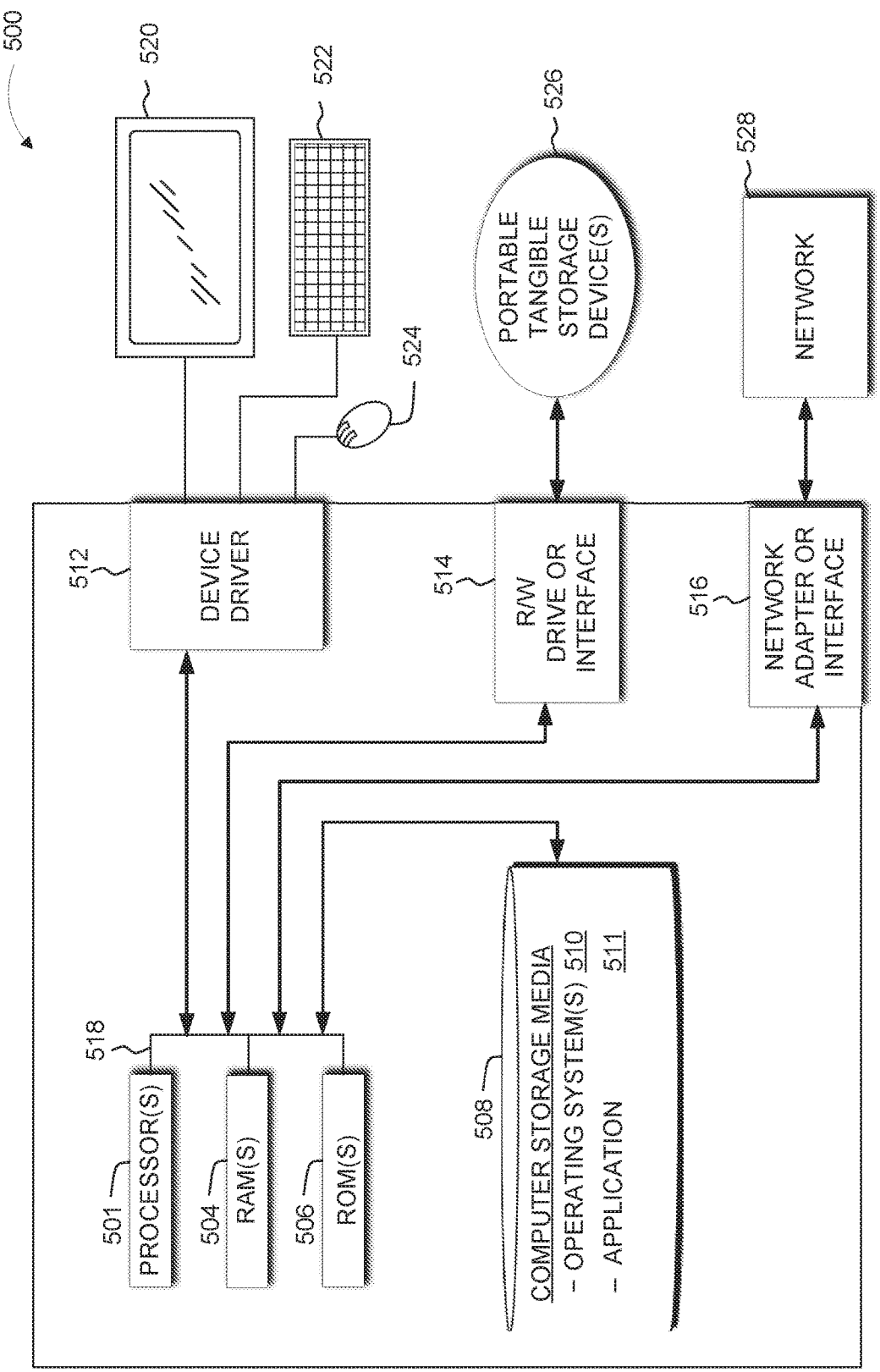
FIG. 5 depicts a block diagram of components of the computer executing the application, in accordance with an embodiment of the present invention.

With reference to FIG. 5, FIG. 5 depicts a block diagram of components of client device 105 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Client device 105 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511, for example, application program 310, are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client device 105 may also include a R/W drive or interface 514 to read from and write to one or more portable computer readable storage media 526. Application programs 511 on client device 105 may be stored on one or more of the portable computer readable storage media 526, read via the respective R/W drive or interface 514 and loaded into the respective computer readable storage media 508.

Client device 105 may also include a network adapter or interface 516, such as a TCP/IP adapter card or wireless communication adapter (such as a 4G wireless communication adapter using OFDMA technology) for connection to a network 528. Application programs 511 on client device 105 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Client device 105 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may comprise hardware and software (stored on computer readable storage media 508 and/or ROM 506).

It should be appreciated that a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details, for example the numerical values, set forth in the preceding description to provide a more thorough understanding thereof; conversely, well-known features may have been omitted or simplified in order not to obscure the description with unnecessary particulars.

Moreover, it is expressly intended that specific elements and/or method steps described in connection with any embodiment of the present disclosure may be incorporated in any other embodiment as a matter of general design choice. Additionally, items presented in a same group and different embodiments, examples or alternatives are not to be construed as de facto equivalent to each other, but they are separate and autonomous entities. In any case, each numerical value should be read as modified by the term about, unless already done, and each range of numerical values should be intended as expressly specifying any possible number along the continuum within the range, comprising its end points. Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for accessing a network. However, the network may be any of any type (for example, a global, wide area or local area network based on any kind of wired or wireless connections such as optical cables, telephone lines, satellite connections and so on).

In an embodiment, the network is accessed by one or more client devices. However, the client devices may be in any number and of any type (for example, IoT devices, smartphones, tablets, laptops and so on).

In an embodiment, the network is accessed via a plurality of access devices of wireless type. However, the access devices may be in any number and of any type (for example, Wi-Fi access points, WiMAX subscribe stations and so on).

In an embodiment, for each of the access devices the method comprises the following steps.

In an embodiment, the method comprises receiving (by the access device) a hand-over request for performing a hand-over from one of the client devices accessing the network via the access device. However, the hand-over request may be received in any way (for example, over the corresponding connection, as ad-hoc information into one or more management frames and so on).

In an embodiment, the hand-over request comprises an indication of one or more candidate access devices of the other access devices for performing the hand-over. However, the candidate access devices may be in any number and of any type (for example, limited in any way according to any quality indicator of their possible connections).

In an embodiment, the method comprises negotiating the hand-over between the access device and a target access device of the candidate access devices in response to the hand-over request. However, the hand-over may be negotiated in any way (for example, in any number of two or more steps, either fixed or variable until an agreement is reached, starting from the source access point or from the target access point, according to any hand-over policy or indiscriminately, and so on); moreover, the target access device may be determined in any way (for example, selected among the candidate access devices in any way, such as according to the hand-over policies, to the quality indicators of the candidate access devices or any combination thereof, simply with a round-robin policy and the like, or even indicated by the client device with directly or with a corresponding preference order).

In an embodiment, said step of negotiating the hand-over comprises receiving (by the access device) a target hand-over token from the target access device via the client device. However, the target hand-over token may be of any type (for example, comprising any type of demands or simply indicating an availability for the hand-over, either certified/authenticated or not) and it may be received in any way via the client device (for example, over the corresponding connection, as ad-hoc information into one or more management frames and so on).

In an embodiment, said step of negotiating the hand-over comprises sending (by the access device) a source hand-over token to the target access device via the client device. However, the source hand-over token may be of any type and it may be sent in any way via the client device (either the same or different with respect to above).

In an embodiment, the method comprises releasing (by the access device) the client device from accessing the network via the access device in response to a positive result of said negotiating the hand-over. However, the connection of the client device may be released in any way (for example, immediately or after the connection with the target access device has been established).

In an embodiment, the method comprises negotiating a further hand-over of a further client device (accessing the network via a source one of the other access devices) between the access device and the source access device. However, the further hand-over may be negotiated in any way (either the same or different with respect to above).

In an embodiment, said step of negotiating the further hand-over comprises sending (by the access device) a further target hand-over token to the source access device via the further client device. However, the further target hand-over token may be of any type (either the same or different with respect to above).

In embodiment, the further target hand-over token is embedded in a management message for establishing access to the network. However, the management message may be of any type (for example, formed by one or more frames of any type according to the corresponding protocol) and the further target hand-over token may be embedded therein in any way (for example, partial, different and additional ways with respect to the ones mentioned above or in any combination thereof).

In embodiment, said step of negotiating the further hand-over comprises receiving (by the access device) a further source hand-over token from the source access device via the further client device. However, the further source hand-over token may be of any type (either the same or different with respect to above).

In embodiment, the further source hand-over token is embedded in a further management message for establishing access to the network. However, the further management message may be of any type and the further source hand-over token may be embedded therein in any way (either the same or different with respect to above).

In an embodiment, the method comprises enabling (by the access device) the further client device to access the network via the access device in response to a positive result of said negotiating the further hand-over. However, the connection of the client device may be established in any way (for example, with any authentication thereof down to none).

In an embodiment, said step of negotiating the further hand-over comprises broadcasting (by the access device) the management message being at least one beacon frame for announcing the access device. However, the beacon frames may be in any number and of any type (according to the corresponding protocol) or they may be replaced by any other frames (even addressed to the client device directly).

In an embodiment, the beacon frame comprises an identifier of the client device. However, the identifier of the client device may be of any type (for example, its MAC address, serial number and so on).

In an embodiment, said step of negotiating the hand-over comprises authenticating (by the access device) the target hand-over token. However, the target hand-over token may be authenticated in any way (for example, by decrypting it with a private key of the access device after its encryption with a corresponding public key, by decrypting it with a public key of the target access device after its encryption with a corresponding private key, by using a digital signature, a certificate and so on).

In an embodiment, said step of negotiating the further hand-over comprises authenticating (by the access device) the further source hand-over token. However, the further source hand-over token may be authenticated in any way (either the same or different with respect to above).

In an embodiment, said step of negotiating the hand-over comprises decrypting (by the access device) the target hand-over token with a private key of the access device. However, the target hand-over token may be decrypted in any way (according to its encryption).

In an embodiment, said step of negotiating the hand-over comprises encrypting (by the access device) the source hand-over token with a public key of the target access device. However, the source hand-over token may be encrypted in any way (for example, by applying an encryption function, a scrambling algorithm and so on).

In an embodiment, said step of negotiating the further hand-over comprises encrypting (by the access device) the further target hand-over token with a public key of the source access device. However, the further target hand-over token may be encrypted in any way (either the same or different with respect to above).

In an embodiment, said step of negotiating the further hand-over comprises decrypting (by the access device) the further source hand-over token with the private key of the access device. However, the further source hand-over token may be decrypted in any way (according to its encryption).

In an embodiment, the method comprises selecting (by the access device) the target access device according to corresponding hand-over policies pre-arranged between the access device and the other access devices. However, the hand-over policies may be in any number (for example, one for each pair of source access point and target access point, one for each pair of access points valid for the hand-overs in both directions and so on) and of any type (for example, based on any number and type of negotiation rules, such as depending on service levels, penalties, obligations, escalations and so on); moreover, the target access device may be selected according to the hand-over policies in any way (for example, alone or in combination with any quality indicators of the candidate access devices).

In an embodiment, the hand-over policies depend on corresponding service levels of the access devices. However, the service levels may be of any type (for example, defined by partial, different and additional parameters with respect to the ones mentioned above or in any combination thereof) and the hand-over policies may depend on them in any way (for example, comprising minimum/maximum service levels for any number of conditions).

In an embodiment, said step of negotiating the hand-over comprises building (by the access device) the source hand-over token according to the hand-over policies. However, the source hand-over token may be built in any way (for example, according to any type of offered costs, penalties, obligations and so on).

In an embodiment, said step of negotiating the further hand-over comprises building (by the access device) the further target hand-over token according to the hand-over policies. However, the further target hand-over token may be built in any way (for example, according to any type of demanded costs, penalties, obligations and so on).

In an embodiment, said step of negotiating the hand-over comprises sending (by the access device) a presentation message to the target access device in response to the hand-over request. However, the presentation message may be sent in any way (for example, over a secure communication channel, via the client device in encrypted from as above and so on).

In an embodiment, the presentation message comprises an identifier of the client device. However, the identifier of the client device may be of any type (either the same or different with respect to above) and it may be provided in any way (for example, as a parameter, embedded in a management message, and so on).

In an embodiment, said step of negotiating the hand-over comprises sending (by the access device) the source hand-over token in response to the target hand-over token. However, the possibility is not excluded of sending the source hand-over token in response to the hand-over request (without any presentation message).

In an embodiment, said step of negotiating the further hand-over comprises receiving (by the access device) a further presentation message from the source access device. However, the further presentation message may be received in any way (either the same or different with respect to above).

In an embodiment, the further presentation message comprises an identifier of the further client device. However, the identifier of the further client device may be of any type and it may be provided in any way (either the same or different with respect to above).

In an embodiment, said step of negotiating the further hand-over comprises sending (by the access device) the further target hand-over token in response to the presentation message. However, the possibility is not excluded of sending the further target hand-over token in response to the further source hand-over request (without any presentation message).

In an embodiment, said step of negotiating the hand-over comprises sending (by the access device) the presentation message over a secure communication channel between the access device and the target access device. However, the secure communication channel may be of any type (for example, based on corresponding public/private keys, a shared key, a tunnel and so on).

In an embodiment, said step of negotiating the further hand-over comprises receiving (by the access device) the further presentation message over a further secure communication channel between the access device and the source access device. However, the further secure communication channel may be of any type (either the same or different with respect to above).

In an embodiment, said negotiating the hand-over comprises receiving (by the access device) the target hand-over token comprising an indication of a demand of the target access device for the hand-over. However, the demand may be of any type (for example, in terms of costs, resources, performance and so on).

In an embodiment, said negotiating the hand-over comprises building (by the access device) the source hand-over token to comprise an offer of the access device for the hand-over according to the demand and to the hand-over policies. However, the offer may be of any type (either the same or different with respect to the demand); moreover, the offer may be determined in any way (for example, to optimize expenses, resource consumption, performance and so on). In any case, the possibility is not excluded of building the source hand-over token directly with the offer (before receiving the demand).

In an embodiment, said negotiating the hand-over comprises receiving (by the access device) a result token from the target access device via the client device. However, the result token may be received via the client device in any way (either the same or different with respect to above).

In an embodiment, the result token is indicative of an acceptance of the offer by the target access device. However, the acceptance of the offer may be indicated in any way (for example, by identifying it or simply by a flag).

In an embodiment, said step of negotiating the further hand-over comprises building (by the access device) the further target hand-over token to comprise a further demand of the access device for the further hand-over according to the hand-over policies. However, the further demand may be of any type and it may be determined in any way (for example, to optimize earnings, resource consumption, performance and so on). In any case, the possibility is not excluded of building the further target hand-over token according to the further offer (if received before).

In an embodiment, said step of negotiating the further hand-over comprises receiving (by the access device) the further source hand-over token comprising an indication of a further offer of the source access device for the further hand-over. However, the further offer may be of any type (either the same or different with respect to above).

In an embodiment, said step of negotiating the further hand-over comprises sending (by the access device) a further result token to the source access device via the client device. However, the further result token may be sent via the client device in any way (either the same or different with respect to above).

In an embodiment, the further result token is indicative of an acceptance of the further offer by the access device according to the hand-over policies. However, the acceptance of the further offer may be indicated in any way (either the same or different with respect to above).

In an embodiment, the further result is embedded in a still further management message for establishing access to the network. However, the still further management message may be of any type and the further result token may be embedded in any way (either the same or different with respect to above).

In an embodiment, said step of negotiating the further hand-over comprises receiving (by the access device) the further management message that is at least one probe request frame for requesting information to the access device. However, the probe request frames may be in any number and of any type (according to the corresponding protocol).

In an embodiment, said step of negotiating the further hand-over comprises sending (by the access device) the still further management message that is at least one probe response frame for responding to said at least one probe request frame. However, the probe response frames may be in any number and of any type (according to the corresponding protocol).

An embodiment provides a method for accessing a network by a client device via a plurality of access devices of wireless type. The method comprises determining (by the client device, accessing the network via a source access device of the access devices) one or more candidate access devices of the other access devices for performing a hand-over. The method comprises sending (by the client device) a hand-over request for performing the hand-over to the source access device. The hand-over request comprises an indication of the candidate access devices. The method comprises negotiating the hand-over between the source access device and a target access device of the candidate access devices in response to the hand-over request. Said step of negotiating the hand-over comprises receiving (by the client device) a target hand-over token from the target access device. The target hand-over token is embedded in a management message for establishing access to the network. Said step of negotiating the hand-over comprises forwarding (by the client device) the target hand-over token to the source access device. Said step of negotiating the hand-over comprises receiving (by the client device) a source hand-over token from the source access device. Said step of negotiating the hand-over comprises forwarding (by the client device) the source hand-over token to the target access device. The source hand-over token is embedded in a further management message for establishing access to the network. The method comprises accessing (by the client device) the network from via the source access device to via the target access device in response to a positive result of said negotiating the hand-over. However, the method may be performed by the client device in any way (see above).

An embodiment provides a method for accessing a network by one or more client devices via a plurality of access devices of wireless type. The method comprises determining (by one of the client devices, accessing the network via a source access device of the access devices) one or more candidate access devices of the other access devices for performing a hand-over. The method comprises sending (by the client device) a hand-over request for performing the hand-over to the source access device. The hand-over request comprises an indication of the candidate access devices. The method comprises negotiating the hand-over between the source access device and a target access device of the candidate access devices in response to the hand-over request. Said step of negotiating the hand-over comprises sending (by the target access device) a target hand-over token to the client device. The target hand-over token is embedded in a first management message for establishing access to the network. Said step of negotiating the hand-over comprises forwarding (by the client device) the target hand-over token to the source access device. Said step of negotiating the hand-over comprises sending (by the source access device) a source hand-over token to the client device. Said step of negotiating the hand-over comprises forwarding (by the client device) the source hand-over token to the target access device. The source hand-over token is embedded in a second management message for establishing access to the network. The method comprises transferring the client device from accessing the network via the source access device to accessing the network via the target access device in response to a positive result of said negotiating the hand-over. However, the method may be performed by the client device and the source/target access devices in any way (see above).

Generally, similar considerations apply if the same solution is implemented with equivalent methods (by using similar steps with the same functions of more steps or portions thereof, removing some non-essential steps or adding further optional steps); moreover, the steps may be performed in a different order, concurrently or in an interleaved way (at least in part).

An embodiment provides a computer program configured for causing a computing device to perform each of the above-described methods when the computer program is executed on the computing device. An embodiment provides a computer program product that comprises a computer readable storage medium having program instructions embodied therewith; the program instructions are executable by a computing device to cause the computing device to perform the same method. However, the computer program may be implemented as a stand-alone module, as a plug-in for a pre-existing software program (for example, any connection manager/agent), or even directly in the latter. Moreover, the computer program may be executed on any computing device (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means that are configured for performing the steps of each of the above-described methods. An embodiment provides a system comprising a circuit (i.e., any hardware suitably configured, for example, by software) for performing each of the steps of the same methods. However, the system may be of any type (for example, formed by a single access device, a single client device or by a whole computing system comprising one or more client devices and a plurality of access devices, each one of any type as above).

Generally, similar considerations apply each computing device has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for accessing a network by one or more client devices via a plurality of access devices of wireless type, wherein the method comprises:

receiving by a first one of the access devices a hand-over request for performing a hand-over from one of the client devices accessing the network via the first access device, the hand-over request comprising an indication of one or more of other ones of the access devices for performing the hand-over;

negotiating the hand-over between the first access device and a target access device of the plurality of access devices in response to the hand-over request, wherein negotiating the hand-over further comprises:

receiving by the first access device a target hand-over token from the target access device via the client device, the target hand-over token comprising a demand of the first access device for the hand-over; and sending by the first access device a source hand-over token to the target access device via the client device, the source hand-over token comprising an offer of the first access device for the hand-over; and releasing by the access device the client device from accessing the network via the access device in response to a successful result of said negotiating the hand-over, wherein releasing the client device further comprises:

negotiating a further hand-over of a further client device accessing the network via a source access device of the plurality of access devices between the access device and the source access device, wherein negotiating the further hand-over further comprises:

sending by the access device a further target hand-over token to the source access device via the further client device, the further target hand-over token being embedded in a management message for establishing access to the network; and receiving by the access device a further source hand-over token from the source access device via the further client device, the further source hand-over token being embedded in a further management message for establishing access to the network; and enabling by the access device the further client device to access the network via the access device in response to a successful result of said negotiating the further hand-over.

2. The method according to claim 1, wherein said negotiating the further hand-over comprises:

broadcasting by the access device the management message, the management message comprising at least one beacon frame for announcing the access device, the beacon frame comprising an identifier of the client device.

3. The method according to claim 1, wherein said negotiating the hand-over comprises:

authenticating by the access device the target hand-over token, wherein said negotiating the further hand-over comprises:

authenticating by the access device the further source hand-over token.

4. The method according to claim 3, wherein said negotiating the hand-over comprises:

decrypting by the access device the target hand-over token with a private key of the access device; and encrypting by the access device the source hand-over token with a public key of the target access device, and wherein said negotiating the further hand-over comprises:

encrypting by the access device the further target hand-over token with a public key of the source access device; and decrypting by the access device the further source hand-over token with the private key of the access device.

5. The method according to claim 1, further comprising:

selecting by the access device the target access device according to corresponding hand-over policies pre-arranged between the access device and the other access devices.

6. The method according to claim 5, wherein the hand-over policies depend on corresponding service levels of the plurality of access devices.

7. The method according to claim 5, wherein said negotiating the hand-over comprises:

building by the access device the source hand-over token according to the hand-over policies, the hand-over policies being prearranged based on performing a type of hand-over; and wherein said negotiating the further hand-over comprises building by the access device the further target hand-over token according to the hand-over policies, the hand-over policies being prearranged based on performing a type of hand-over.

8. The method according to claim 1, wherein said negotiating the hand-over comprises:

sending by the access device a presentation message to the target access device in response to the hand-over request, the presentation message comprising an identifier of the client device; and sending by the access device the source hand-over token in response to the target hand-over token; and wherein said negotiating the further hand-over comprises:

receiving by the access device a further presentation message from the source access device, the further presentation message comprising an identifier of the further client device, and sending by the access device the further target hand-over token in response to the presentation message.

9. The method according to claim 8, wherein said negotiating the hand-over comprises:

sending by the access device the presentation message over a secure communication channel between the access device and the target access device, and wherein said negotiating the further hand-over comprises:

receiving by the access device the further presentation message over a further secure communication channel between the access device and the source access device.

10. The method according to claim 8, wherein said negotiating the hand-over comprises:

receiving by the access device the target hand-over token comprising an indication of a demand of the target access device for the hand-over;

building by the access device the source hand-over token to comprise an offer of the access device for the hand-over according to the demand and to corresponding hand-over policies pre-arranged between the access device and the other access devices; and receiving by the access device a result token from the target access device via the client device, the result token being indicative of an acceptance of the offer by the target access device, and wherein said negotiating the further hand-over comprises:

building by the access device the further target hand-over token to comprise a further demand of the access device for the further hand-over according to the hand-over policies;

receiving by the access device the further source hand-over token comprising an indication of a further offer of the source access device for the further hand-over; and sending by the access device a further result token to the source access device via the client device, the further result token being indicative of an acceptance of the further offer by the access device according to the hand-over policies, the further result being embedded in a still further management message for establishing access to the network.

11. The method according to claim 10, wherein said negotiating the further hand-over comprises:

receiving by the access device the further management message, the management message comprising at least one probe request frame for requesting information to the access device; and sending by the access device the still further management message, the management message comprising at least one probe response frame for responding to said at least one probe request frame.

12. A computer program product for accessing a network by one or more client devices via a plurality of access devices of wireless type, the computer program product comprising: one or more non-transitory computer-readable storage media and program instructions stored on the one or more non-transitory computer-readable storage media, the program instructions comprising:
  instructions to receive a hand-over request for performing a hand-over from one of the client devices accessing the network via a first one of the access devices, the hand-over request comprising an indication of one or more of other ones of the access devices for performing the hand-over;
  instructions to negotiate the hand-over between the first access device and a target access device of the plurality of access devices in response to the hand-over request, wherein the instructions to negotiate further comprises:
    instructions to receive a target hand-over token from the target access device via the client device, the target hand-over token comprising a demand of the first access device for the hand-over; and
    instructions to send a source hand-over token to the target access device via the client device, the source hand-over token comprising an offer of the first access device for the hand-over; and
  instructions to release the client device from accessing the network via the access device in response to a successful result of said negotiating the hand-over, wherein the instructions to release further comprises:
    instructions to negotiate a further hand-over of a further client device accessing the network via a source access device of the plurality of access devices between the access device and the source access device, wherein the instructions to negotiate a further hand-over comprises:
      instructions to send a further target hand-over token to the source access device via the further client device, the further target hand-over token being embedded in a management message for establishing access to the network; and
      instructions to receive a further source hand-over token from the source access device via the further client device, the further source hand-over token being embedded in a further management message for establishing access to the network; and
    instructions to enable the further client device to access the network via the access device in response to a successful result of said negotiating the further hand-over.

13. The computer program product of claim 12, wherein said instructions to negotiate the further hand-over comprises:
  instructions to broadcast by the access device the management message, the management message comprising at least one beacon frame for announcing the access device, the beacon frame comprising an identifier of the client device.

14. The computer program product of claim 12, wherein said instructions to negotiate the hand-over comprises:
  instructions to authenticate by the access device the target hand-over token, wherein said instructions to negotiate the further hand-over comprises:
    instructions to authenticate by the access device the further source hand-over token.

15. The computer program product of claim 14, wherein said instructions to negotiate the hand-over comprises:
  instructions to decrypt by the access device the target hand-over token with a private key of the access device; and
  instructions to encrypt by the access device the source hand-over token with a public key of the target access device, and wherein said instructions to negotiate the further hand-over comprises:
    instructions to encrypt by the access device the further target hand-over token with a public key of the source access device; and
    instructions to decrypt by the access device the further source hand-over token with the private key of the access device.

16. The computer program product of claim 12, further comprising:
  instructions to select by the access device the target access device according to corresponding hand-over policies pre-arranged between the access device and the other access devices.

17. The computer program product of claim 16, wherein the hand-over policies depend on corresponding service levels of the plurality of access devices.

18. The computer program product of claim 16, wherein said instructions to negotiate the hand-over comprises:
  instructions to build by the access device the source hand-over token according to the hand-over policies, the hand-over policies being prearranged based on preferring a type of hand-over; and wherein said instructions to negotiate the further hand-over comprises:
    instructions to build by the access device the further target hand-over token according to the hand-over policies.

19. The computer program product of claim 12, wherein said instructions to negotiate the hand-over comprises:
  instructions to send by the access device a presentation message to the target access device in response to the hand-over request, the presentation message comprising an identifier of the client device; and
  instructions to send by the access device the source hand-over token in response to the target hand-over token; and wherein said negotiating the further hand-over comprises:
    instructions to receive by the access device a further presentation message from the source access device, the further presentation message comprising an identifier of the further client device, and
    instructions to send by the access device the further target hand-over token in response to the presentation message.

20. A computer system for accessing a network by one or more client devices via a plurality of access devices of wireless type, the computer system comprising:
  one or more computer processors;
  one or more computer-readable storage media;
  program instructions stored on the computer-readable storage media for execution by at least one of the one or more processors, the program instructions comprising:
    instructions to receive a hand-over request for performing a hand-over from one of the client devices accessing the network via a first one of the access devices, the hand-over request comprising an indication of one or more of other ones of the access devices for performing the hand-over;

instructions to negotiate the hand-over between the first access device and a target access device of the plurality of access devices in response to the hand-over request, wherein the instructions to negotiate further comprises:

instructions to receive a target hand-over token from the target access device via the client device, the target hand-over token comprising a demand of the first access device for the hand-over; and instructions to send a source hand-over token to the target access device via the client device, the source hand-over token comprising an offer of the first access device for the hand-over; and instructions to release the client device from accessing the network via the access device in response to a successful result of said negotiating the hand-over, wherein the instructions to release further comprises:

instructions to negotiate a further hand-over of a further client device accessing the network via a source access device of the plurality of access devices between the access device and the source access device, wherein the instructions to negotiate a further hand-over comprises:

instructions to send a further target hand-over token to the source access device via the further client device, the further target hand-over token being embedded in a management message for establishing access to the network; and instructions to receive a further source hand-over token from the source access device via the further client device, the further source hand-over token being embedded in a further management message for establishing access to the network; and instructions to enable the further client device to access the network via the access device in response to a successful result of said negotiating the further hand-over.

\* \* \* \* \*